(12) United States Patent  (10) Patent No.: US 8,870,469 B2
Kachmar  (45) Date of Patent: Oct. 28, 2014

(54) FIBER OPTIC CONNECTOR AND METHOD OF APPLYING SAME TO A FIBER OPTIC CABLE

(75) Inventor: Wayne M. Kachmar, North Bennington, VT (US)

(73) Assignee: ADC Telecommunications, Inc., Berwyn, PA (US)

( * ) Notice: Subject to any disclaimer, the term of this patent is extended or adjusted under 35 U.S.C. 154(b) by 607 days.

(21) Appl. No.: 13/106,524

(22) Filed: May 12, 2011

(65) Prior Publication Data

US 2011/0280521 A1   Nov. 17, 2011

Related U.S. Application Data

(60) Provisional application No. 61/333,800, filed on May 12, 2010.

(51) Int. Cl.
  G02B 6/36   (2006.01)
  G02B 6/38   (2006.01)
(52) U.S. Cl.
  CPC ............ *G02B 6/3821* (2013.01); *G02B 6/3887* (2013.01); *G02B 6/3869* (2013.01)
  USPC ............................................ 385/78; 385/139
(58) Field of Classification Search
  None
  See application file for complete search history.

(56) References Cited

U.S. PATENT DOCUMENTS

| | | | |
|---|---|---|---|
| 5,199,095 A * | 3/1993 | Iapicco | 385/100 |
| 5,394,497 A * | 2/1995 | Erdman et al. | 385/78 |
| 6,565,261 B1 * | 5/2003 | Uchiyama et al. | 385/60 |
| 6,579,014 B2 | 6/2003 | Melton et al. | |
| 6,648,520 B2 | 11/2003 | McDonald et al. | |
| 6,899,467 B2 | 5/2005 | McDonald et al. | |
| 7,013,074 B2 | 3/2006 | Battey et al. | |
| 7,044,650 B1 | 5/2006 | Tran et al. | |
| 7,090,406 B2 | 8/2006 | Melton et al. | |
| 7,090,407 B2 | 8/2006 | Melton et al. | |
| 7,111,990 B2 | 9/2006 | Melton et al. | |
| 7,113,679 B2 | 9/2006 | Melton et al. | |
| 7,184,634 B2 | 2/2007 | Hurley et al. | |
| 7,467,896 B2 | 12/2008 | Melton et al. | |
| 7,568,844 B2 | 8/2009 | Luther et al. | |
| 7,572,065 B2 | 8/2009 | Lu et al. | |
| 7,744,286 B2 | 6/2010 | Lu et al. | |
| 7,744,288 B2 | 6/2010 | Lu et al. | |
| 7,762,726 B2 | 7/2010 | Lu et al. | |
| 7,881,576 B2 | 2/2011 | Melton et al. | |
| 7,918,609 B2 | 4/2011 | Melton et al. | |
| 7,942,590 B2 | 5/2011 | Lu et al. | |
| 7,959,361 B2 | 6/2011 | Lu et al. | |
| 8,041,166 B2 | 10/2011 | Kachmar | |
| 8,202,008 B2 | 6/2012 | Lu et al. | |

* cited by examiner

*Primary Examiner* — Michelle R Connelly
(74) *Attorney, Agent, or Firm* — Merchant & Gould P.C.

(57) ABSTRACT

A fiber optic connector includes a shroud, spring, ferrule mount, shrink tube, and ferrule. The connector terminates a fiber optic cable including an optical fiber and a strength member. The ferrule terminates the optical fiber and is mounted to the ferrule mount. The ferrule mount attaches to the strength member and includes an exterior retaining surface and a passage for the optical fiber. The shroud is mounted over the ferrule mount and includes an interior retaining surface. The exterior and the interior retaining surfaces engage to limit distal movement of the shroud relative to the ferrule mount and the attached cable. The spring engages the cable and the shroud and distally urges the shroud relative to the cable. The shrink tube forms a seal between the shroud and the cable and can proximally urge the shroud relative to the ferrule mount. This proximal urging is overcome by the spring.

24 Claims, 15 Drawing Sheets

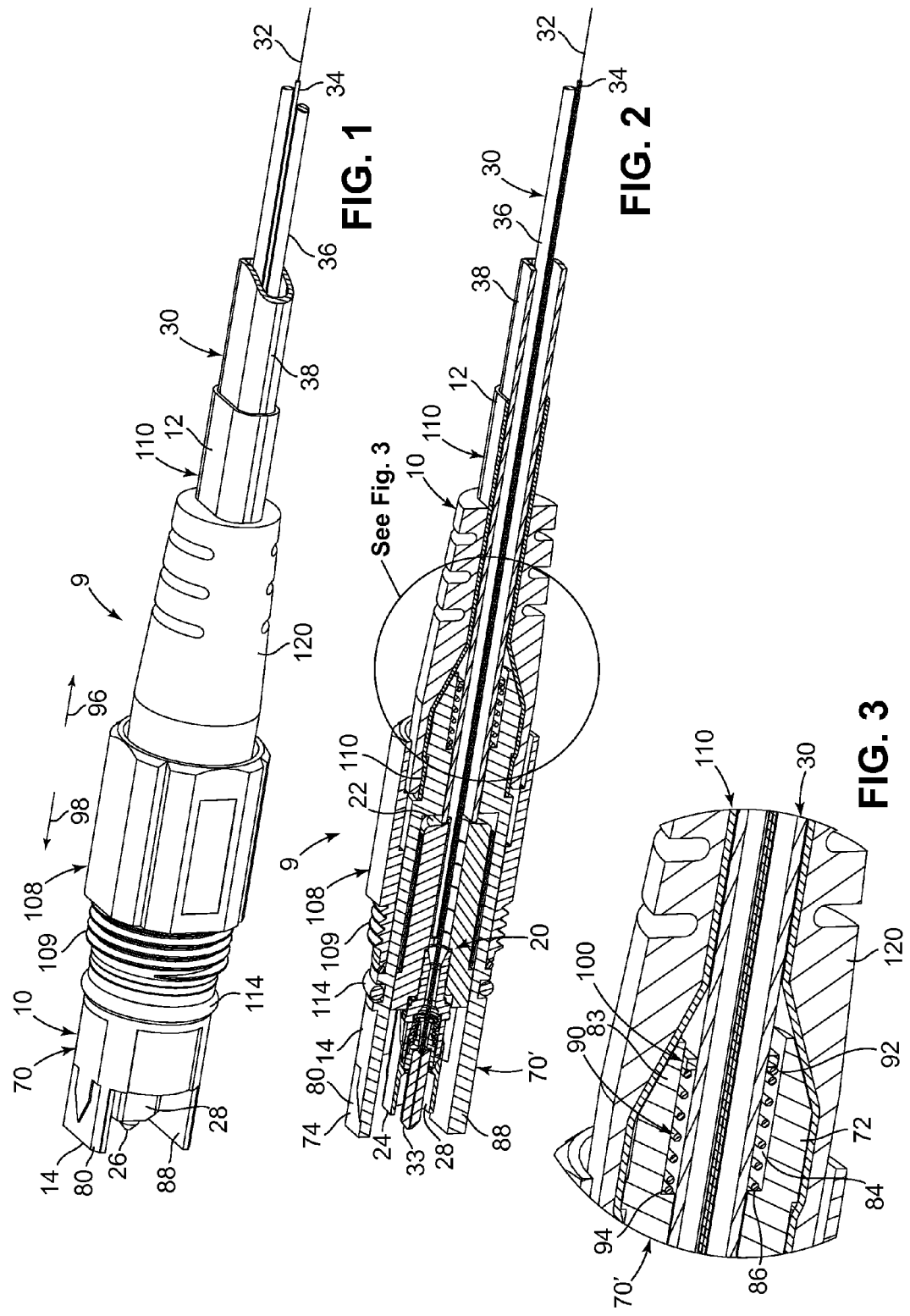

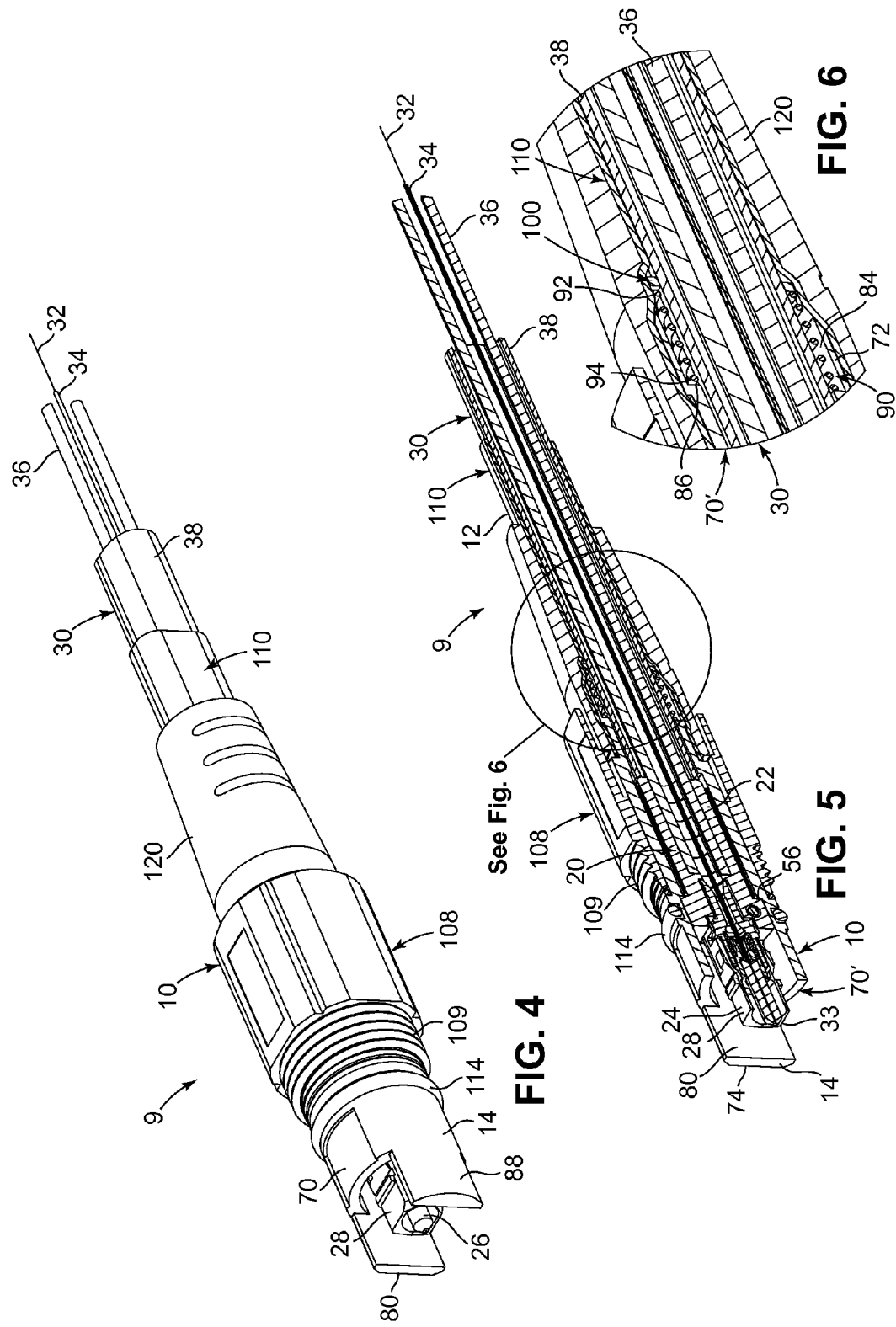

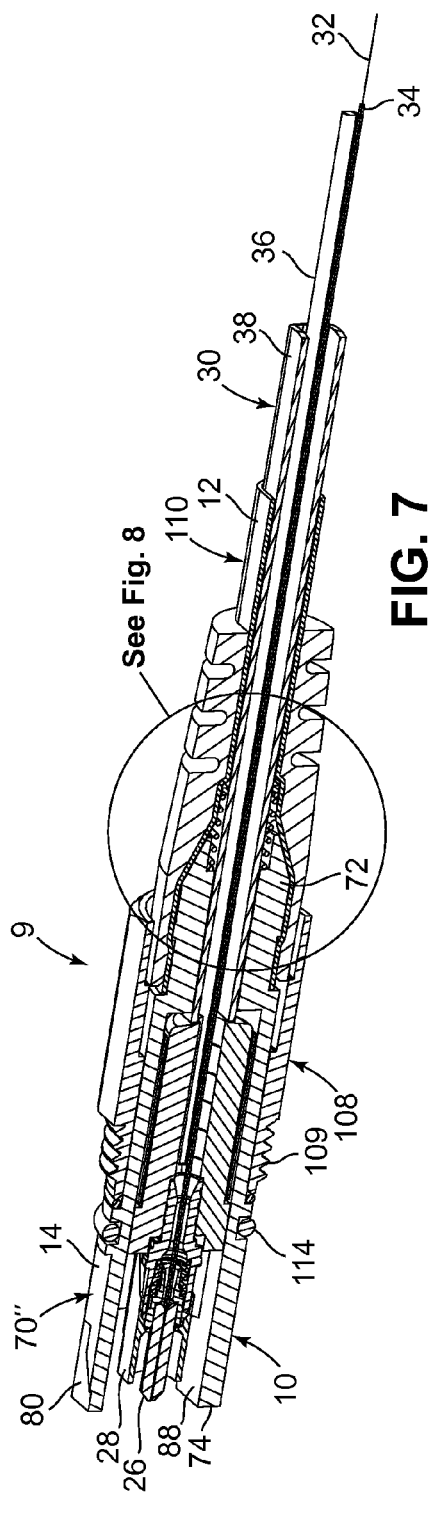
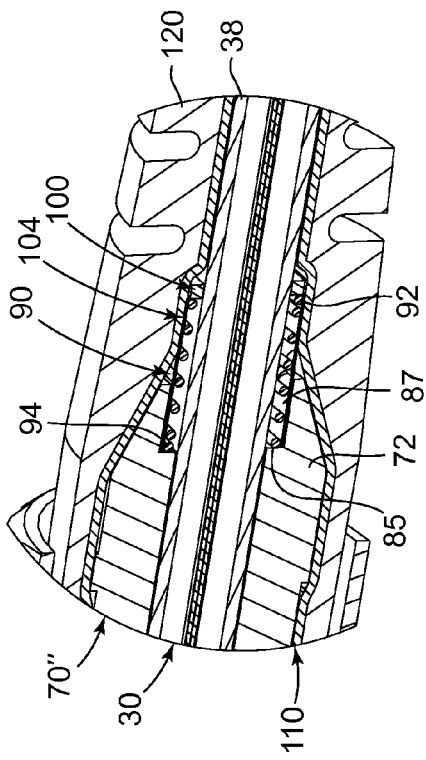
FIG. 7
FIG. 8

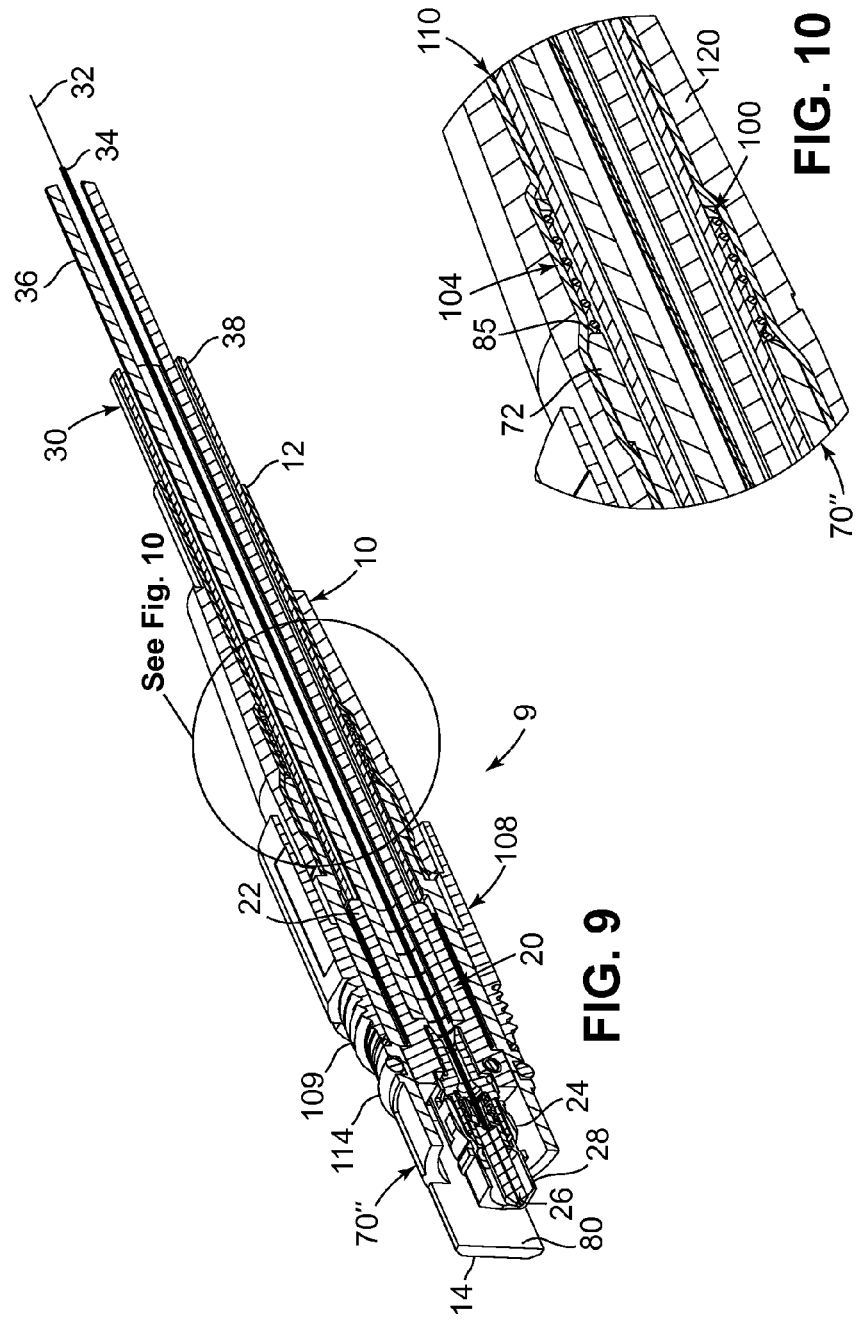

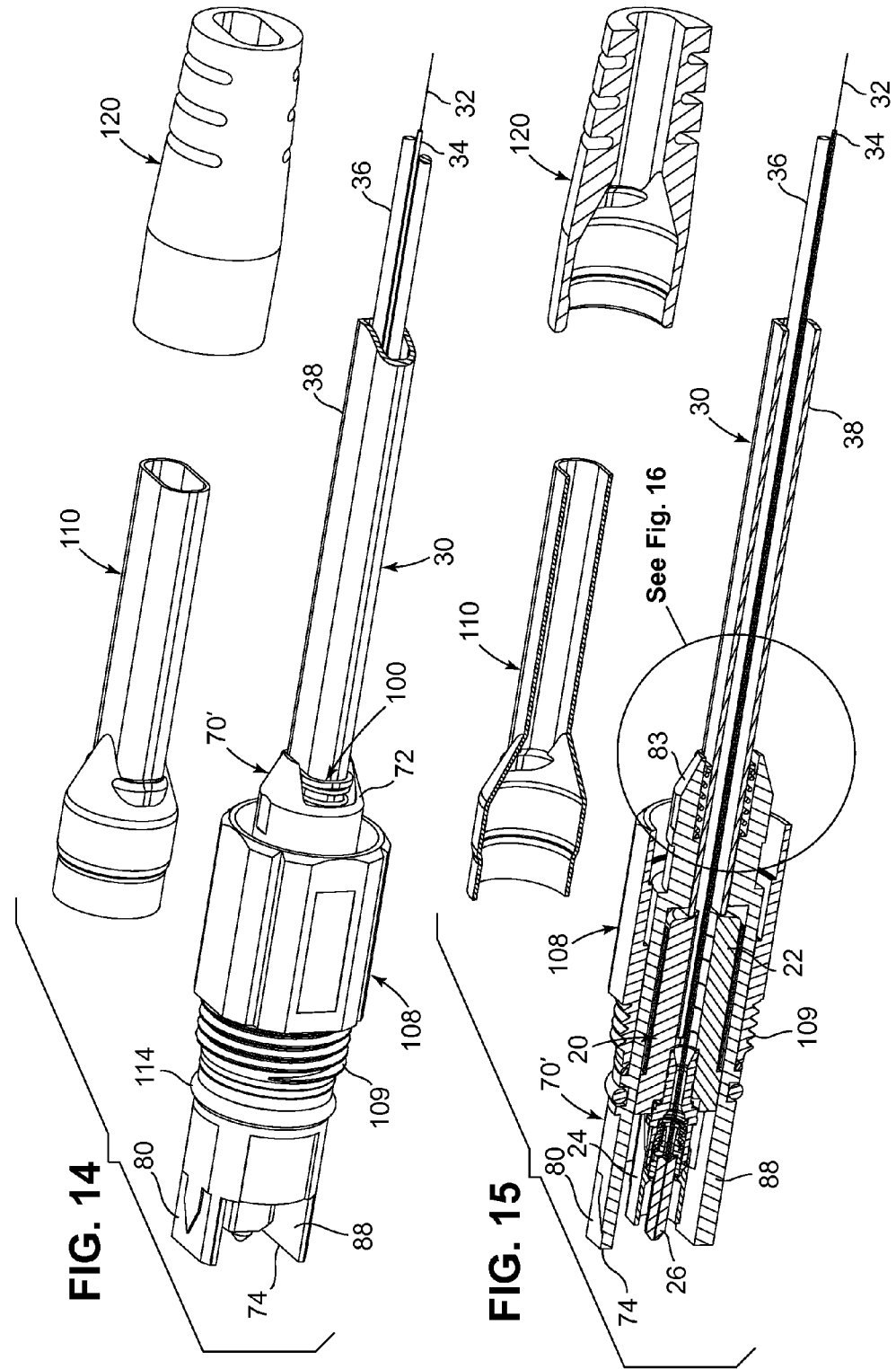

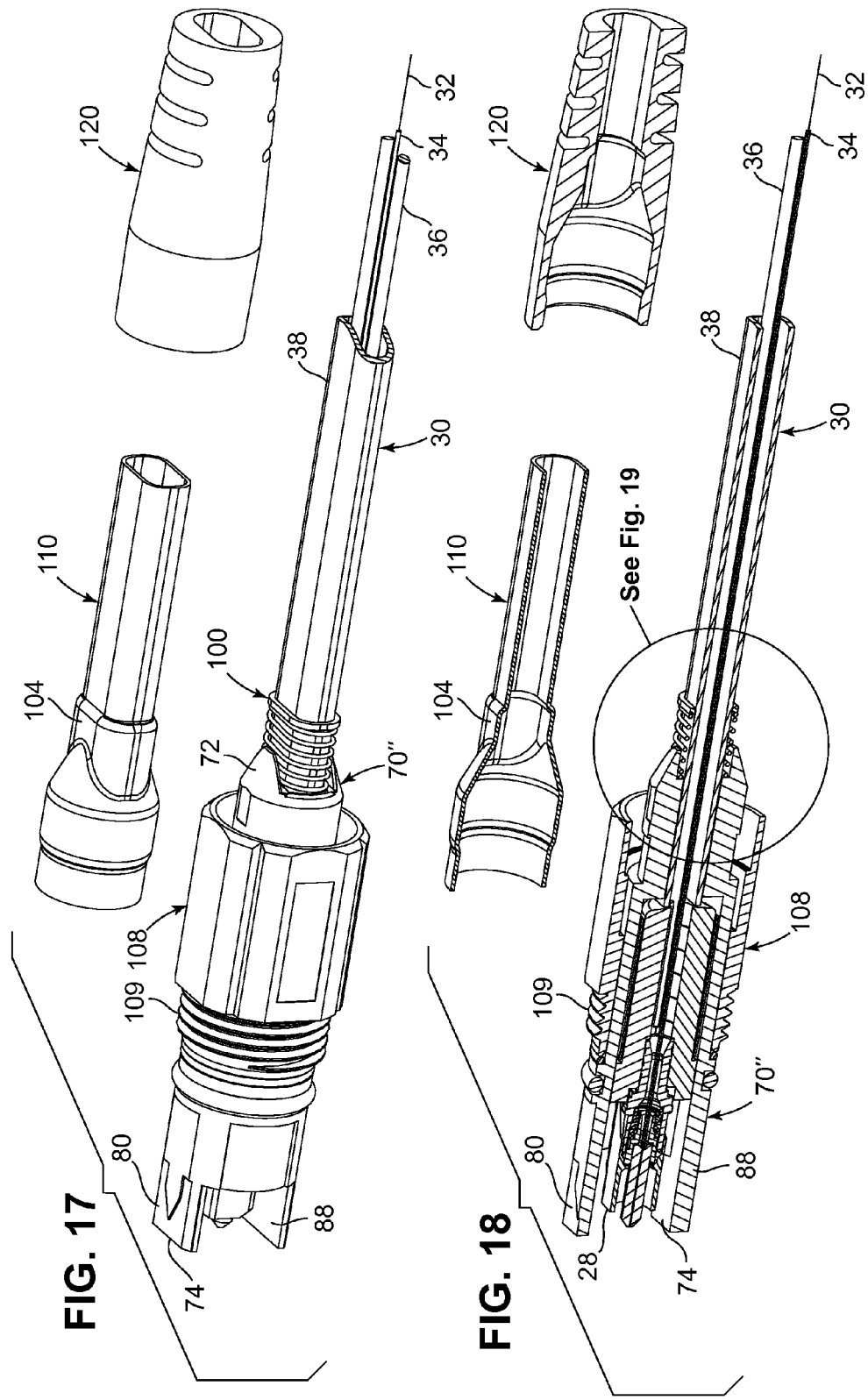

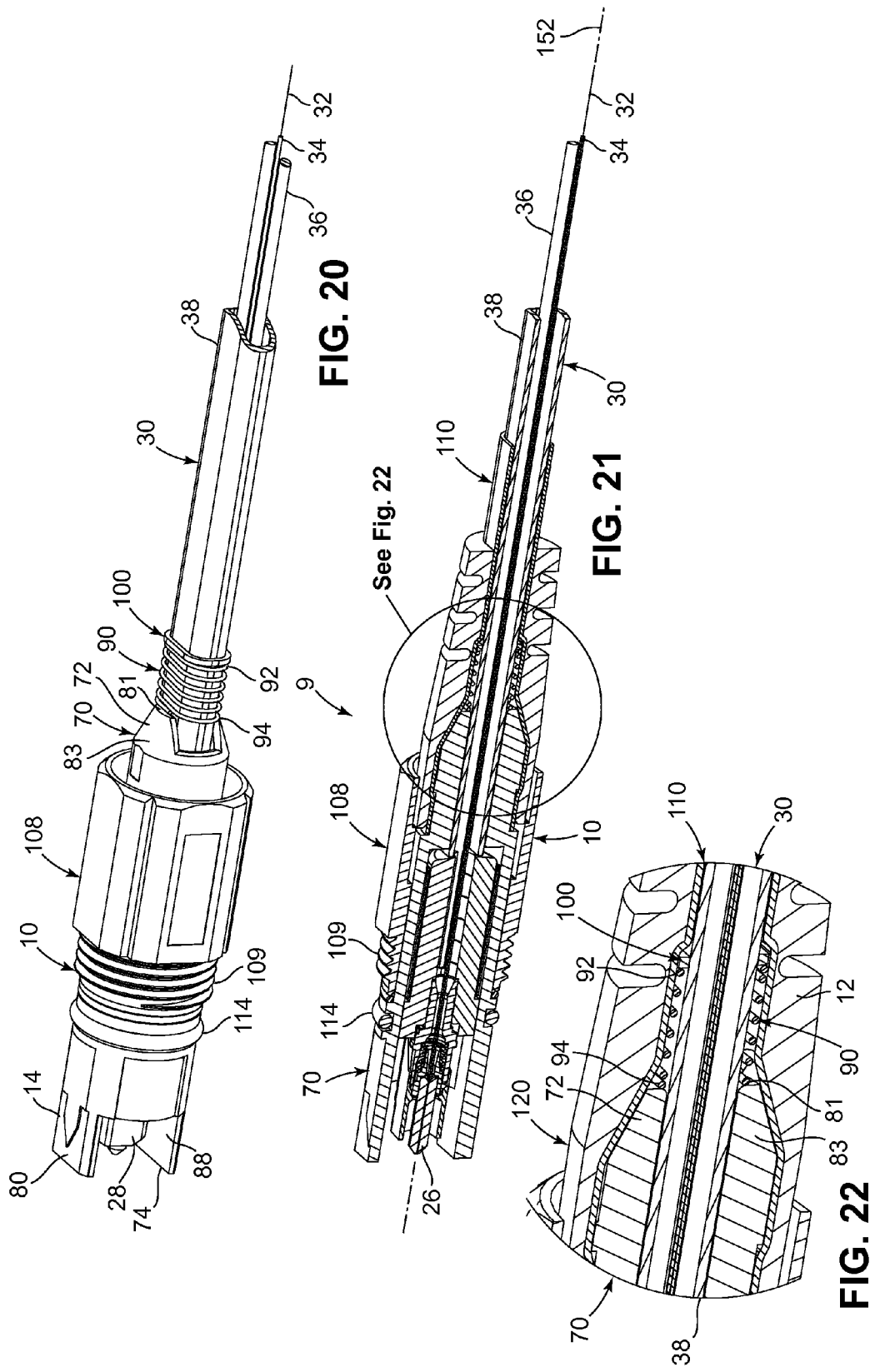

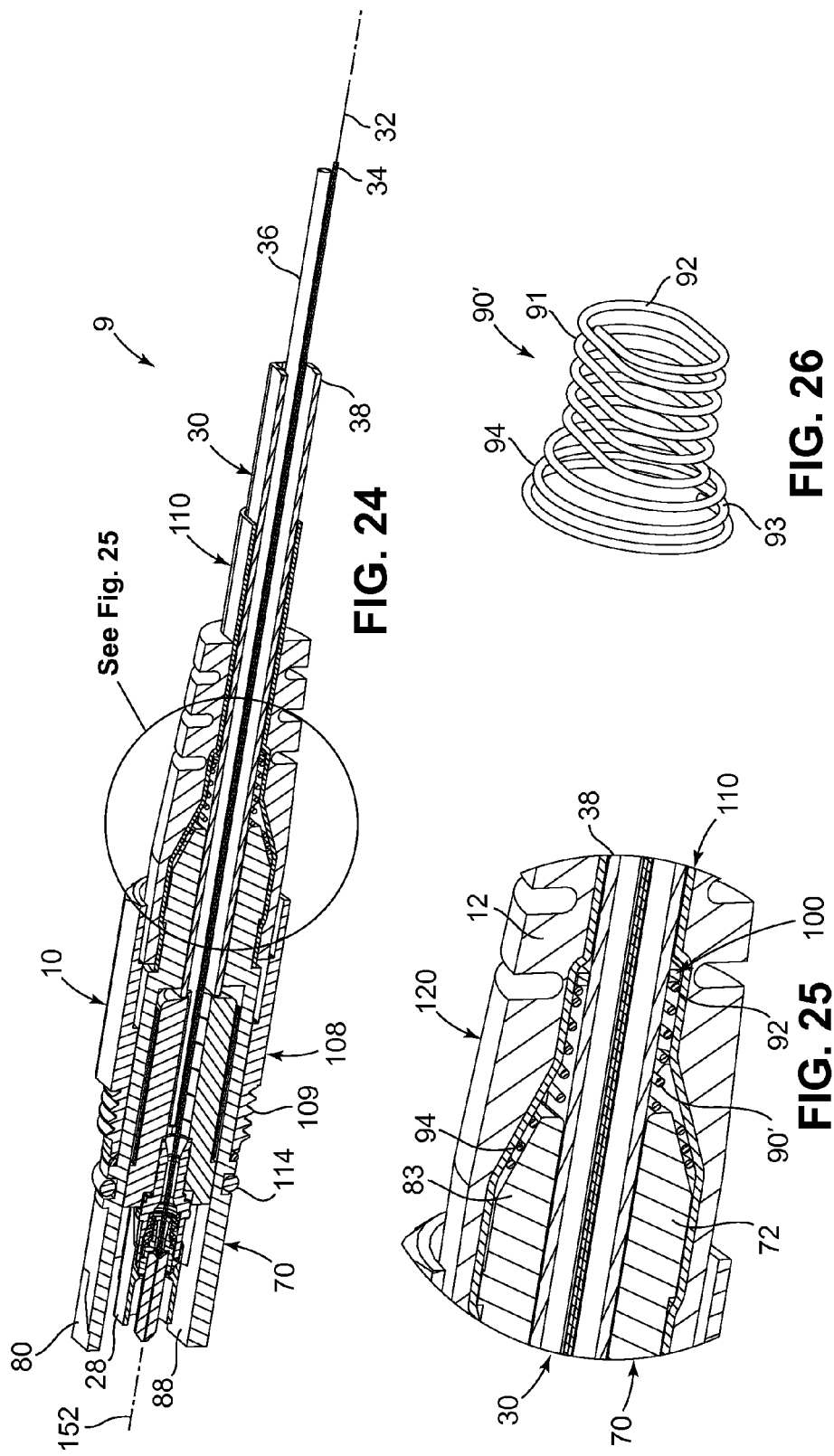

FIBER OPTIC CONNECTOR AND METHOD OF APPLYING SAME TO A FIBER OPTIC CABLE

CROSS-REFERENCE TO RELATED APPLICATION

This application claims the benefit of U.S. Provisional Patent Application Ser. No. 61/333,800, filed May 12, 2010, which application is hereby incorporated by reference in its entirety.

TECHNICAL FIELD

The present disclosure relates to fiber optic cable connection systems and methods of retaining a fiber optic connector to a fiber optic cable.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and a fiber optic adapter for mechanically and optically coupling the fiber optic connectors together. Fiber optic connectors generally include ferrules that support the ends of the optical fibers of the fiber optic cables. The end faces of the ferrules are typically polished and are often angled. The fiber optic adapter includes co-axially aligned ports (i.e., receptacles) for receiving the fiber optic connectors desired to be interconnected. The fiber optic adapter includes an internal sleeve that receives and aligns the ferrules of the fiber optic connectors when the connectors are inserted within the ports of the fiber optic adapter. With the ferrules and their associated fibers aligned within the sleeve of the fiber optic adapter, a fiber optic signal can pass from one fiber to the next. The adapter also typically has a mechanical fastening arrangement (e.g., a snap-fit arrangement or a threaded arrangement) for mechanically retaining the fiber optic connectors within the adapter. Examples of existing fiber optic connection systems are described at U.S. Pat. Nos. 6,579,014, 6,648,520, 6,899,467, 7,090,406, 7,090,407, 7,013,074, 7,044,650, 7,113,679, 7,184,634, and 7,467,896.

SUMMARY OF THE DISCLOSURE

The present disclosure relates to a fiber optic connector that is compatible with a fiber optic adapter. In certain embodiments, the fiber optic connector is a ruggedized fiber optic connector, and/or the fiber optic adapter is a ruggedized fiber optic adapter. The fiber optic connector extends between a proximal end and a distal end. The proximal end of the fiber optic connector is adapted for attachment to a fiber optic cable, and the distal end of the fiber optic connector is adapted for connection with the fiber optic adapter. The fiber optic connector includes a ferrule, a plug body, a plug mount, a shroud, and a spring. The plug body and the plug mount can together form a ferrule mount. The fiber optic connector forms a fiber optic connector and cable assembly when secured to the fiber optic cable. The fiber optic connector and cable assembly is adapted for connection with the fiber optic adapter.

The ferrule is adapted to hold at least one optical fiber of the fiber optic cable. The ferrule terminates an end of the at least one optical fiber. The plug body is adapted to mount the ferrule. The plug mount extends between a proximal end and a distal end. The proximal end of the plug mount is adapted for attachment to at least one strength member of the fiber optic cable, and the distal end of the plug mount is adapted for mounting the plug body. The plug mount includes a passage and an exterior retaining surface. The exterior retaining surface of the plug mount can be a proximally facing shoulder. The passage extends between the proximal end and the distal end of the plug mount and is adapted to receive the optical fiber or fibers of the fiber optic cable. The shroud extends between a proximal end and a distal end. The shroud includes a through-passage that extends between the proximal end and the distal end of the shroud. The through-passage of the shroud is adapted to receive at least a portion of the plug mount. The shroud includes an interior retaining surface adapted to engage the exterior retaining surface of the plug mount and thereby limit distal movement of the shroud relative to the plug mount. The interior retaining surface of the shroud can be a distally facing shoulder. The shroud can include a pair of opposed paddles at the distal end of the shroud that is adapted to engage the fiber optic adapter. The spring includes a first end and a second end. The first end of the spring is adapted to engage the fiber optic cable, and the second end of the spring is adapted to engage the shroud. The spring is adapted to urge the shroud in a distal direction relative to the fiber optic cable. The spring can be a compression spring (e.g., a coiled compression spring). The first end of the spring can be a proximal end, and the second end of the spring can be a distal end.

The fiber optic connector can include a spring keeper that is adapted to engage the proximal end of the spring. The spring keeper can be adapted for attachment to a jacket of the fiber optic cable and thereby engage the proximal end of the spring with the fiber optic cable. The jacket of the fiber optic cable surrounds the at least one optical fiber and the at least one strength member. The shroud can include a pocket with a shoulder adapted to abut the distal end of the spring. The pocket can be adapted to substantially enclose the spring. Alternatively, the proximal end of the shroud can be adapted to abut the distal end of the spring. A sleeve can be positioned around the spring.

The fiber optic connector can further include a heat shrink tube adapted to provide a seal between the proximal end of the shroud and the jacket of the fiber optic cable. Any urging of the shroud by the heat shrink tube in a proximal direction relative to the fiber optic cable can be overcome by the spring urging the shroud in the distal direction relative to the fiber optic cable.

The plug mount can include a pair of half pieces and a retaining sleeve that is adapted to retain the half pieces to each other. The at least one strength member of the fiber optic cable can include a pair of the strength members positioned on opposite sides of the at least one optical fiber. The half pieces can each include a pair of grooves adapted to receive the pair of the strength members.

The fiber optic connector can further include a retention member that is adapted for connection with the fiber optic adapter. The retention member includes a first abutment surface. The shroud can include a second abutment surface that is adapted to abut the first abutment surface of the retention member. The second abutment surface of the shroud can include a proximally facing shoulder on an exterior of the shroud. The retention member can be a threaded retaining nut, and the first abutment surface of the threaded retaining nut can include a distally facing surface. A sealing member (e.g., an O-ring) can be mounted on the shroud. The sealing member is adapted to provide a second seal between the distal end of the shroud and the fiber optic adapter.

The fiber optic connector can include the ferrule mount. The ferrule mount extends between a proximal end and a distal end. The proximal end of the ferrule mount attaches to the at least one strength member of the fiber optic cable, and the distal end of the ferrule mount mounts the ferrule. The ferrule mount includes a passage and an exterior retaining surface. The passage extends between the proximal end and the distal end of the ferrule mount and receives the at least one optical fiber of the fiber optic cable. The through-passage of the shroud receives at least a portion of the ferrule mount. The interior retaining surface of the through-passage of the shroud engages the exterior retaining surface of the ferrule mount and thereby limits distal movement of the shroud relative to the ferrule mount. The first end of the spring engages the fiber optic cable, and the second end of the spring engages the shroud. The spring urges the shroud in the distal direction relative to the fiber optic cable.

The present disclosure also relates to a method of connectorizing a fiber optic cable. The method includes: a) providing the fiber optic cable; b) providing the heat shrink tube; c) positioning the heat shrink tube over the jacket of the fiber optic cable; d) providing the spring; e) positioning the spring over the jacket of the fiber optic cable; f) providing the shroud; g) positioning the shroud over the jacket of the fiber optic cable; h) providing the ferrule; i) terminating the end of the at least one optical fiber with the ferrule; j) providing the ferrule mount; k) attaching the ferrule mount to the ferrule; l) attaching the ferrule mount to the at least one strength member of the fiber optic cable; m) engaging the interior retaining surface of the shroud with the exterior retaining surface of the ferrule mount by sliding the shroud over the ferrule mount in the distal direction; n) engaging the spring with the fiber optic cable; and o) engaging the spring with the shroud such that the shroud is urged by the spring in the distal direction.

The method can further include: p) shrinking the heat shrink tube over at least a portion of the shroud and over at least a portion of the jacket of the fiber optic cable (any urging of the shroud by the heat shrink tube in the proximal direction relative to the fiber optic cable can be overcome by the spring urging the shroud in the distal direction relative to the fiber optic cable); q) providing the spring keeper; r) engaging the spring keeper with the jacket of the fiber optic cable and the spring (the spring keeper thereby engages the spring with the fiber optic cable); s) providing the retention member that includes the distally facing surface; t) positioning the retention member over at least a portion of the shroud; u) positioning the distally facing surface of the retention member adjacent the proximally facing shoulder of the shroud; v) mounting the ferrule within the plug body of the ferrule mount thereby attaching the ferrule mount to the ferrule; w) mounting the plug body and the at least one strength member of the fiber optic cable between the pair of the half pieces of the ferrule mount thereby attaching the ferrule mount to the at least one strength member; and x) attaching the retaining sleeve of the ferrule mount over at least a portion of the pair of the half pieces thereby retaining the half pieces to each other and to the plug body and the at least one strength member.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 1 is a perspective view of a fiber optic connector, including a shroud, a boot, and a shrink tube, terminating a fiber optic cable;

FIG. 2 is a cross-sectional perspective view, sharing the perspective of FIG. 1, of the fiber optic connector and cable of FIG. 1, including a spring and a shroud with a pocket for the spring;

FIG. 3 is an enlarged portion of FIG. 2;

FIG. 4 is another perspective view of the fiber optic connector and cable of FIG. 1;

FIG. 5 is a cross-sectional perspective view, sharing the perspective of FIG. 4, of the fiber optic connector and cable of FIG. 1 with the spring and the shroud of FIG. 2;

FIG. 6 is an enlarged portion of FIG. 5;

FIG. 7 is a cross-sectional perspective view, similar to FIG. 2, of the fiber optic connector and cable of FIG. 1, including a shroud with a relief for the spring of FIG. 2;

FIG. 8 is an enlarged portion of FIG. 7;

FIG. 9 is a cross-sectional perspective view, similar to FIG. 5, of the fiber optic connector and cable of FIG. 1, including the shroud of FIG. 7;

FIG. 10 is an enlarged portion of FIG. 9;

FIG. 14 is a partially exploded perspective view, sharing the perspective of FIG. 1, of the fiber optic connector and cable of FIG. 1 with the spring and the shroud of FIG. 2;

FIG. 15 is a cross-sectional cut-away of the partially exploded perspective view of FIG. 14;

FIG. 17 is a partially exploded perspective view, similar to FIG. 14, of the fiber optic connector and cable of FIG. 1 with the shroud of FIG. 7;

FIG. 18 is a cross-sectional cut-away of the partially exploded perspective view of FIG. 17;

FIG. 20 is a perspective view, sharing the perspective of FIG. 1, of the fiber optic connector and cable of FIG. 1 with the boot and the shrink tube of FIG. 1 removed thereby revealing the spring of FIG. 2 engaging the shroud of FIG. 1;

FIG. 21 is a cross-sectional perspective view, similar to FIG. 2, of the fiber optic connector and cable of FIG. 1, including the shroud of FIG. 1;

FIG. 22 is an enlarged portion of FIG. 21;

FIG. 24 is a cross-sectional perspective view, similar to FIG. 2, of the fiber optic connector and cable of FIG. 1, including the shroud of FIG. 1 and the spring of FIG. 23;

FIG. 25 is an enlarged portion of FIG. 24;

FIG. 26 is an enlarged perspective view, sharing the perspective of FIG. 23, of the spring of FIG. 23;

DETAILED DESCRIPTION

Figure 27:
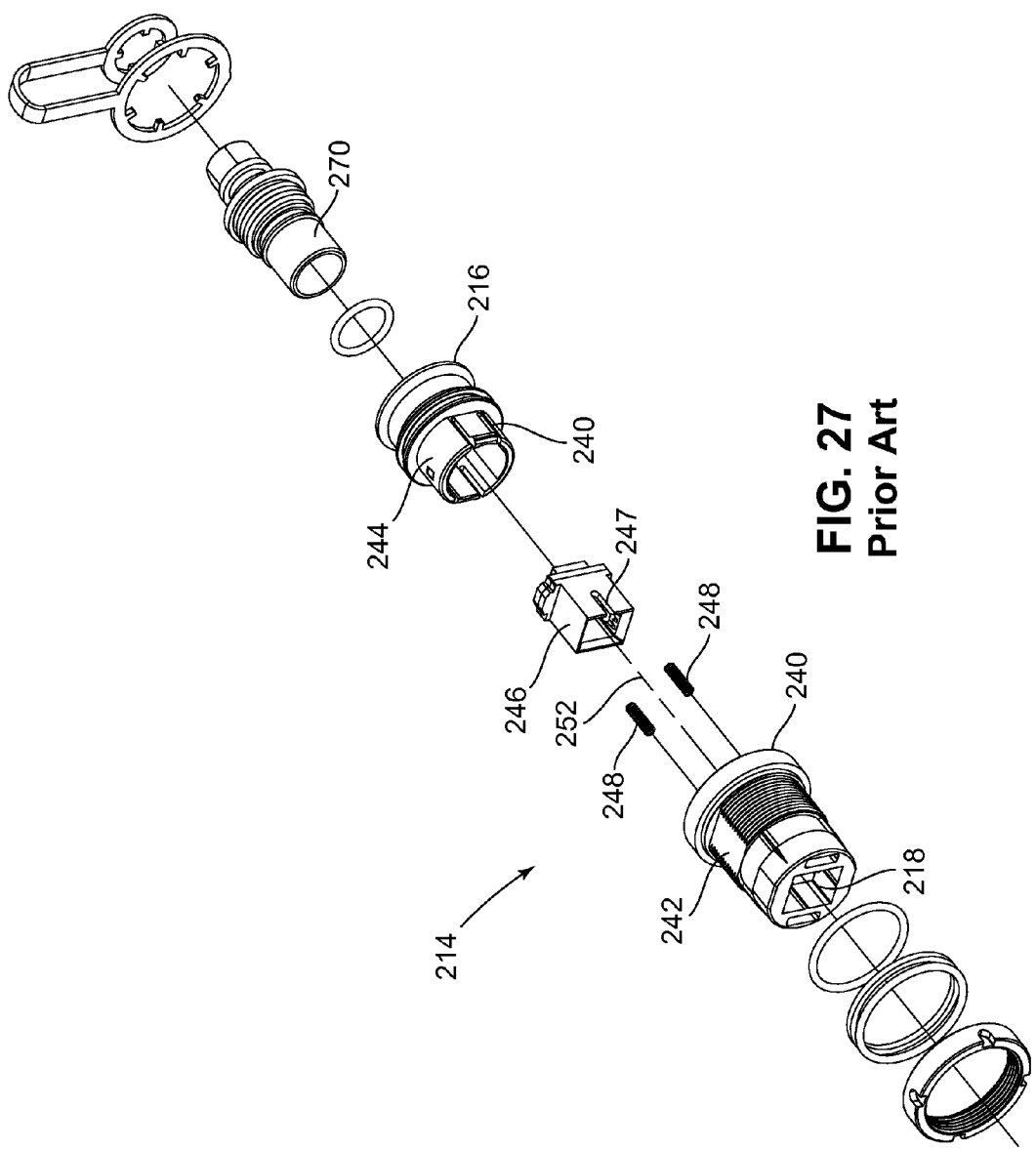
FIG. 27 is an exploded perspective view of a prior art fiber optic adapter that is compatible with the fiber optic connector of FIG. 1.
Figure 29:
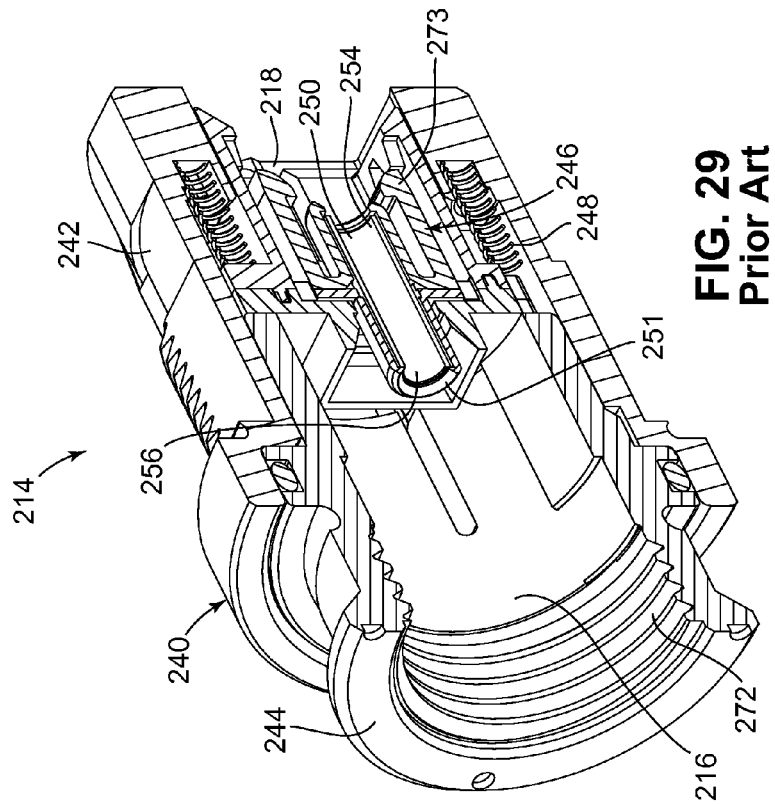
FIG. 29 is an enlarged cross-sectional perspective view, sharing the perspective of FIG. 28, of the prior art fiber optic adapter of FIG. 27.
Figure 28:
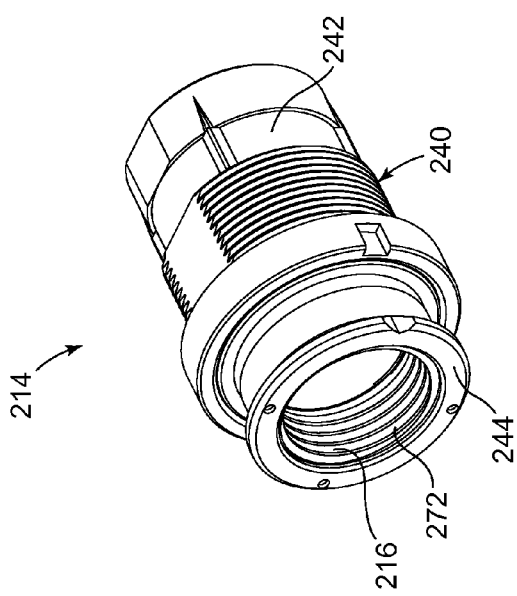
FIG. 28 is a perspective view of the prior art fiber optic adapter of FIG. 27.

The present disclosure relates to fiber optic connectors that are compatible and connectable with fiber optic adapters. The fiber optic connectors are used to terminate fiber optic cables and thereby connectorized the fiber optic cables. FIGS. 27-29 illustrate a prior art fiber optic adapter 214 that can be mounted on an enclosure or other optical component. FIGS. 1-11 and 14-25 illustrate an example fiber optic connector 10 that is compatible with the fiber optic adapter 214. The fiber optic connector 10 can connectorized an example fiber optic cable 30 and thereby form a fiber optic connector and cable assembly 9.

Figure 12:
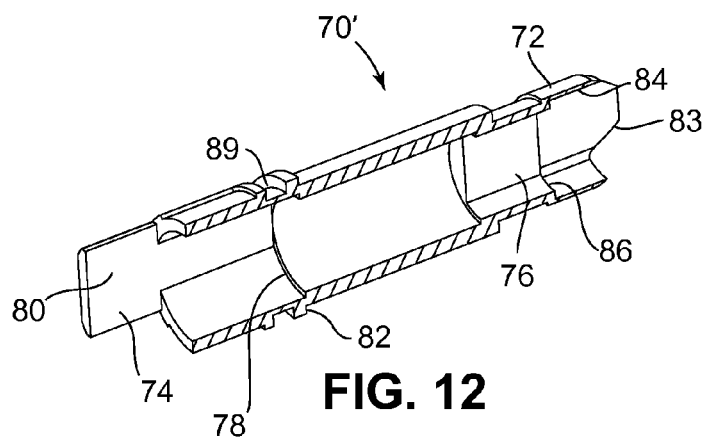
FIG. 12 is a cross-sectional perspective view, sharing the perspective of FIG. 4, of the shroud of FIG. 2.
Figure 13:
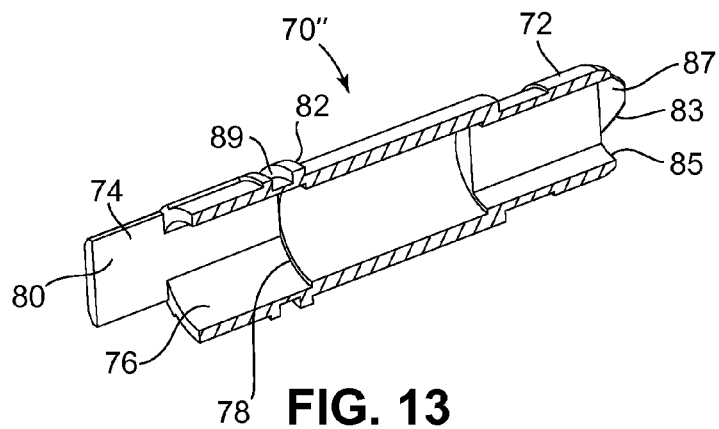
FIG. 13 is a cross-sectional perspective view, sharing the perspective of FIG. 4, of the shroud of FIG. 7.
Figure 16:
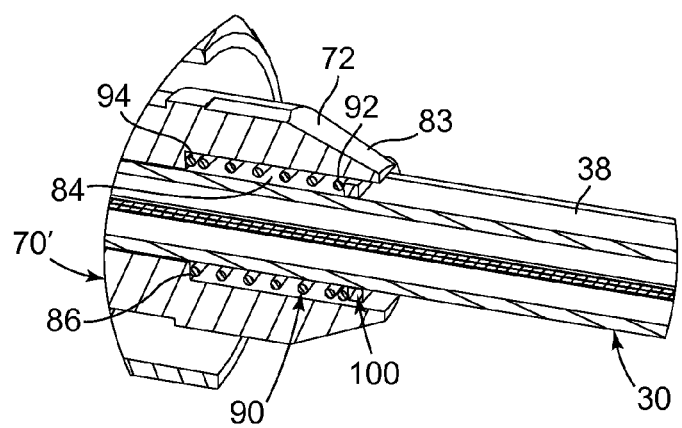
FIG. 16 is an enlarged portion of FIG. 15.
Figure 19:
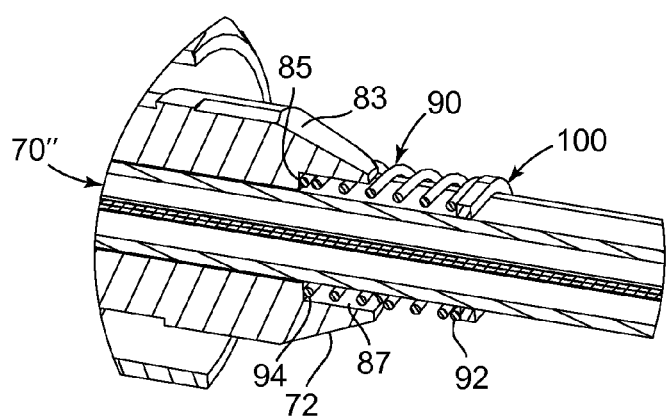
FIG. 19 is an enlarged portion of FIG. 18.

The connector and cable assembly 9 can be connected to the optical component by connecting the fiber optic connector 10 to the component mounted fiber optic adapter 214. The fiber optic cable 30 includes one or more strength members 36 capable of transferring tensile and other loads that are applied on the fiber optic cable 30 to the optical component. A ferrule mount 20 of the fiber optic connector 10 attaches to and terminates the strength members 36 and thereby transfers the loads from the fiber optic cable 30 to the fiber optic connector 10. The fiber optic connector 10 includes a shroud 70, 70', or 70" (see FIGS. 21, 12, and 13) that transfers the loads from the ferrule mount 20 to the fiber optic adapter 214 and thereby transfers the loads from the fiber optic connector 10 to the fiber optic adapter 214. The shrouds 70, 70', and 70" will collectively be referenced as the shroud 70. In the depicted embodiment, the fiber optic connector 10 includes a retention member 108 that is adapted for connection with the fiber optic adapter 214, and the shroud 70 transfers the loads from the ferrule mount 20 to the fiber optic adapter 214 via the retention member 108.

As is further described hereinafter, a connection between the ferrule mount 20 and the shroud 70 includes an exterior retaining surface 56 (see FIGS. 5 and 11) of the ferrule mount 20 abutting an interior retaining surface 78 of the shroud 70 (see FIGS. 11 and 12). The tensile load, applied across the fiber optic connector 10, urges the exterior and interior retaining surfaces 56, 78 together. The exterior and interior retaining surfaces 56, 78 limit movement of the shroud 70 in a distal direction 98 (see FIG. 1) relative to the ferrule mount 20 and the attached fiber optic cable 30. The abutted exterior and interior retaining surfaces 56, 78 locate the shroud 70 relative to the ferrule mount 20 along a central longitudinal axis 152 (see FIG. 21) of the fiber optic connector 10. As is further described hereinafter, the fiber optic connector 10 includes a spring 90 or 90' (see FIGS. 11 and 26) that urges the shroud 70 in the distal direction 98 relative to the ferrule mount 20 and the attached fiber optic cable 30 and thereby keeps the shroud 70 properly positioned along the central longitudinal axis 152 within the connector and cable assembly 9. The springs 90 and 90' will collectively be referenced as the spring 90. The spring 90 resists movement of the shroud 70 in a proximal direction 96 (see FIG. 1) relative to the ferrule mount 20 and the attached fiber optic cable 30.

Figure 11:
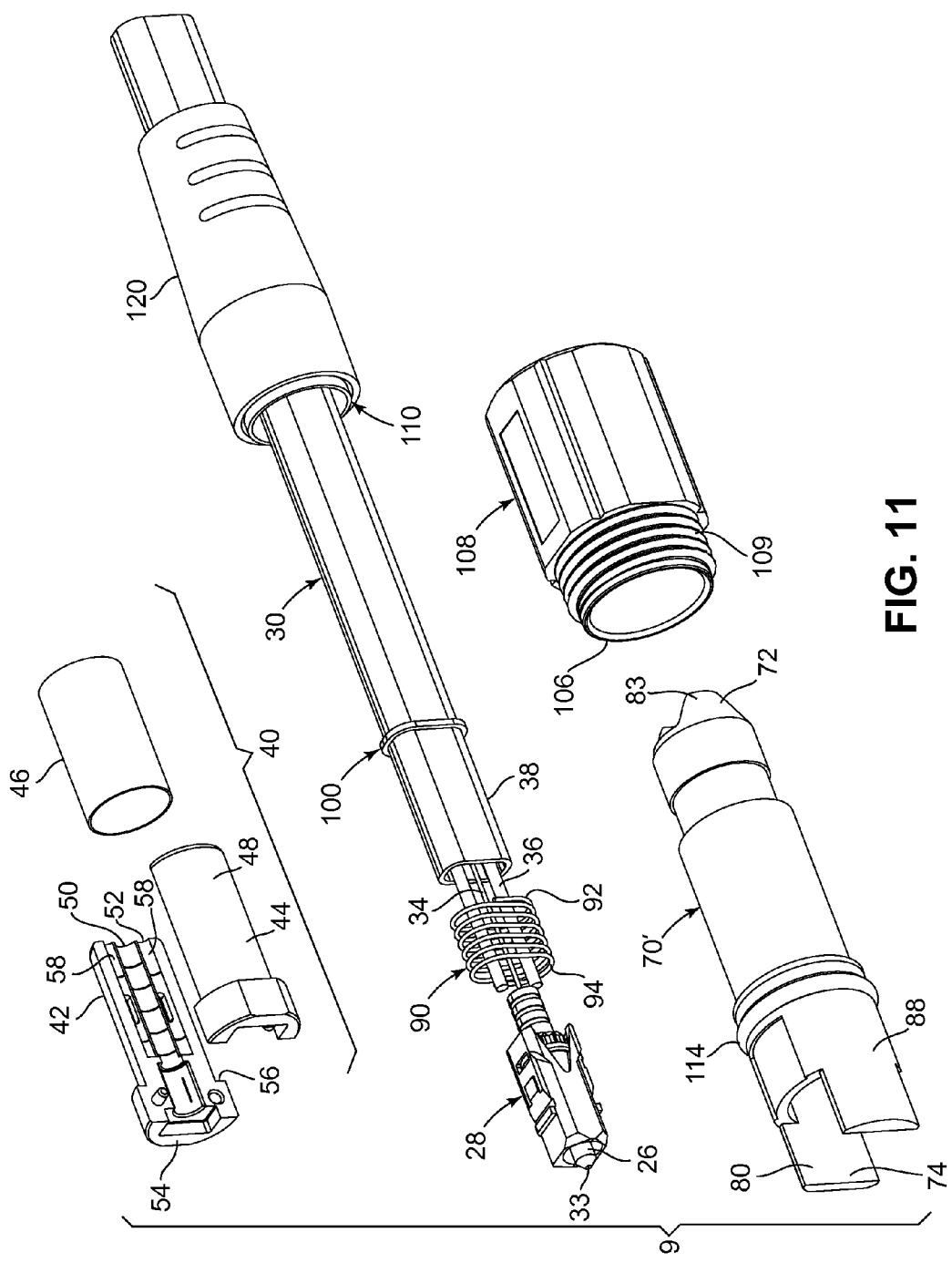
FIG. 11 is an exploded perspective view, sharing the perspective of FIG. 4, of the fiber optic connector and cable of FIG. 1 with the spring and the shroud of FIG. 2.

In the depicted embodiment, the retention member 108 is a threaded retaining nut including external threads 109 and a distally facing abutment surface 106 (see FIG. 11). In the depicted embodiment, the shroud 70 includes an abutment surface 82 (see FIGS. 12 and 13). A connection between the shroud 70 and the fiber optic adapter 214 includes the abutment surface 106 abutting the abutment surface 82. The tensile load, transferred between the fiber optic connector 10 and the fiber optic adapter 214, urges the abutment surfaces 106, 82 together. The external threads 109 of the retention member 108 retain a distal end 14 of the fiber optic connector 10 within an outer port 216 of the fiber optic adapter 214. The abutment surface 106 of the retention member 108 traps a distal end 74 of the shroud 70 within the outer port 216 of the fiber optic adapter 214.

The shroud 70 can also be used to environmentally seal the fiber optic connector 10 and provide a sealing interface between the fiber optic connector 10 and the outer port 216 of the fiber optic adapter 214. The fiber optic connector 10 includes a heat shrink tube 110 that provides a seal between a proximal end 72 of the shroud 70 and the fiber optic cable 30. A boot 120 can be installed over the heat shrink tube 110 to provide minimum bend radius protection to one or more optical fibers 32 within the fiber optic cable 30.

In applying (i.e., shrinking) the shrink tube 110 over the proximal end 72 of the shroud 70 and a jacket 38 of the fiber optic cable 30, the shrink tube 110 can urge the shroud 70 in the proximal direction 96 relative to the ferrule mount 20 and the attached fiber optic cable 30. The shrinking action of the shrink tube 110 can cause this urging. After assembly of the connector and cable assembly 9, creep, relaxation, and/or other changes in the shrink tube 110 can similarly urge the shroud 70 in the proximal direction 96. Friction between the shrink tube 110 and the jacket 38 and/or the shroud 70 can transfer this urging to the shroud 70 from the shrink tube 110. The connection between the ferrule mount 20 and the shroud 70, including the exterior retaining surface 56 of the ferrule mount 20 abutting the interior retaining surface 78 of the shroud 70, limits movement of the shroud 70 in the distal direction 98 relative to the ferrule mount 20 and the attached fiber optic cable 30. However, this urging is in the proximal direction 96 of the shroud 70 relative to the ferrule mount 20 and the attached fiber optic cable 30. If this urging is allowed to move the shroud 70 in the proximal direction 96, the relative positions of components within the fiber optic connector 10 would be altered and thus interfere with functional aspects of the connector 10. However, as mentioned above, the spring 90 resists movement of the shroud 70 in the proximal direction 96 relative to the ferrule mount 20 and the attached fiber optic cable 30. The spring 90 thereby prevents or limits/reduces proximal movement of the shroud 70.

Other details of the connector and cable assembly 9 are discussed below. The fiber optic connector and cable assembly 9 is adapted for connection with the fiber optic adapter 214. The fiber optic connector 10 extends between a proximal end 12 and the distal end 14. The proximal end 12 attaches to the fiber optic cable 30, and the distal end 14 connects with the fiber optic adapter 214. In the depicted embodiment, the fiber optic cable 30 is depicted as a flat fiber optic tether cable with a pair of the strength members 36 on opposite sides of a buffer layer 34 surrounding a single optical fiber 32. The jacket 38 surrounds the optical fiber 32 and the strength members 36.

The fiber optic connector 10 includes a ferrule 26, a plug body 28, a plug mount 40, the shroud 70, and the spring 90. The plug body 28 and the plug mount 40 together form the ferrule mount 20. The plug mount 40 includes a pair of half pieces 42, 44 and a retaining sleeve 46 that retains the half pieces 42, 44 to each other (e.g., by crimping the retaining sleeve 46 over a portion 48 of the half pieces 42, 44). The pair of the strength members 36 are positioned on opposite sides of the optical fiber 32. The half pieces 42, 44 each include a pair of grooves 58 adapted to receive the pair of the strength members 36. The ferrule mount 20 extends between a proximal end 22 and a distal end 24. The proximal end 22 attaches to the pair of the strength members 36 of the fiber optic cable 30, and the distal end 24 mounts the ferrule 26. The ferrule mount 20 includes the passage 50 and the exterior retaining surface 56. The passage 50 extends between the proximal end 22 and the distal end 24 and receives the optical fiber 32 of the fiber optic cable 30. The through-passage 76 of the shroud 70 receives at least a portion of the ferrule mount 20. The interior retaining surface 78 of the through-passage 76 engages the exterior retaining surface 56 of the ferrule mount 20 and thereby limits distal movement of the shroud 70 relative to the ferrule mount 20.

The depicted ferrule 26 holds an end 33 of the optical fiber 32 of the fiber optic cable 30. The plug body 28 mounts the ferrule 26 at a distal end of the plug body 28. The plug mount 40 extends between a proximal end 52 and a distal end 54 (see FIG. 11). The proximal end 52 attaches to the pair of the strength members 36 of the fiber optic cable 30, and the distal end 54 mounts the plug body 28. An adhesive can be used to attach the strength members 36 to the proximal end 52. The plug mount 40 includes the exterior retaining surface 56 and a passage 50 for the optical fiber 32. The exterior retaining surface 56 is a proximally facing shoulder. The passage 50 extends between the proximal end 52 and the distal end 54 and receives the optical fiber 32 of the fiber optic cable 30.

The shroud 70 extends between the proximal end 72 and the distal end 74. The shroud 70 includes a through-passage 76 that extends between the proximal end 72 and the distal end 74. The through-passage 76 receives at least a portion of the plug mount 40. The shroud 70 includes the interior retaining surface 78 that engages the exterior retaining surface 56 of the plug mount 40 and thereby limits distal movement of the shroud 70 relative to the plug mount 40. The interior retaining surface 78 is a distally facing shoulder. The shroud 70 includes a pair of opposed paddles 80, 88 at the distal end 74 that engage the fiber optic adapter 214. The shroud 70 includes the abutment surface 82 that abuts the abutment surface 106. The abutment surface 82 includes a proximally facing shoulder on an exterior 77 of the shroud 70. FIGS. 1, 2, 4, 5, 7, 9, 11, 14, 15, 17, 18, 20, 21, 23, and 24 illustrate a rubber ring positioned around the exterior 77 of the shroud 70 adjacent the abutment surface 82. In embodiments with this rubber ring included, the abutment surface 106 of the retention member 108 abuts this rubber ring which, in turn, abuts the abutment surface 82 of the shroud 70. In other embodiments, the abutment surface 106 directly abuts the abutment surface 82.

The spring 90 includes a first end 92 and a second end 94. The first end 92 engages the fiber optic cable 30, and the second end 94 engages the shroud 70. Direct contact between the spring 90 and the shroud 70 is not necessary as long as the spring 90 urges the shroud 70 in the distal direction 98 relative to the fiber optic cable 30. Any urging of the shroud 70 by the heat shrink tube 110 in the proximal direction 96, relative to the fiber optic cable 30, is overcome by the spring 90 urging the shroud 70 in the distal direction 98 relative to the fiber optic cable 30. The depicted spring 90 is a compression spring (e.g., a coiled compression spring). In other embodiments, the spring 90 can be a tension spring or other spring-like element. In the depicted embodiment, the first end 92 of the spring 90 is a proximal end, and the second end 94 is a distal end. In other embodiments, the ends 92, 94 can be reversed and/or the spring 90 can engage the fiber optic cable 30 and/or the shroud 70 at a location other than the ends 92, 94.

In the depicted embodiment, the fiber optic connector 10 includes a spring keeper 100 that engages the proximal end 92 of the spring 90. The spring keeper 100 attaches to the jacket 38 of the fiber optic cable 30 (e.g., by crimping, gluing, etc.) and thereby engages the proximal end 92 with the fiber optic cable 30. In other embodiments, the end 92 or other portion of the spring 90 can directly engage the fiber optic cable 30 at the jacket 38 and/or the strength member(s) 36. In other embodiments, the spring keeper 100 can engage the strength member(s) 36 rather than the jacket 38 of the fiber optic cable 30. In still other embodiments, the spring keeper 100 can engage both the jacket 38 and the strength member(s) 36 of the cable 30.

In the depicted embodiment, the distal end 14 of the fiber optic connector 10 has a generally cylindrical shape. In contrast, the depicted fiber optic cable 30 has a flat or an oval-like cross-section. The shroud 70 includes a pair of transition features 83 at the proximal end 72 that smoothly accommodate this change in shape.

Figure 23:
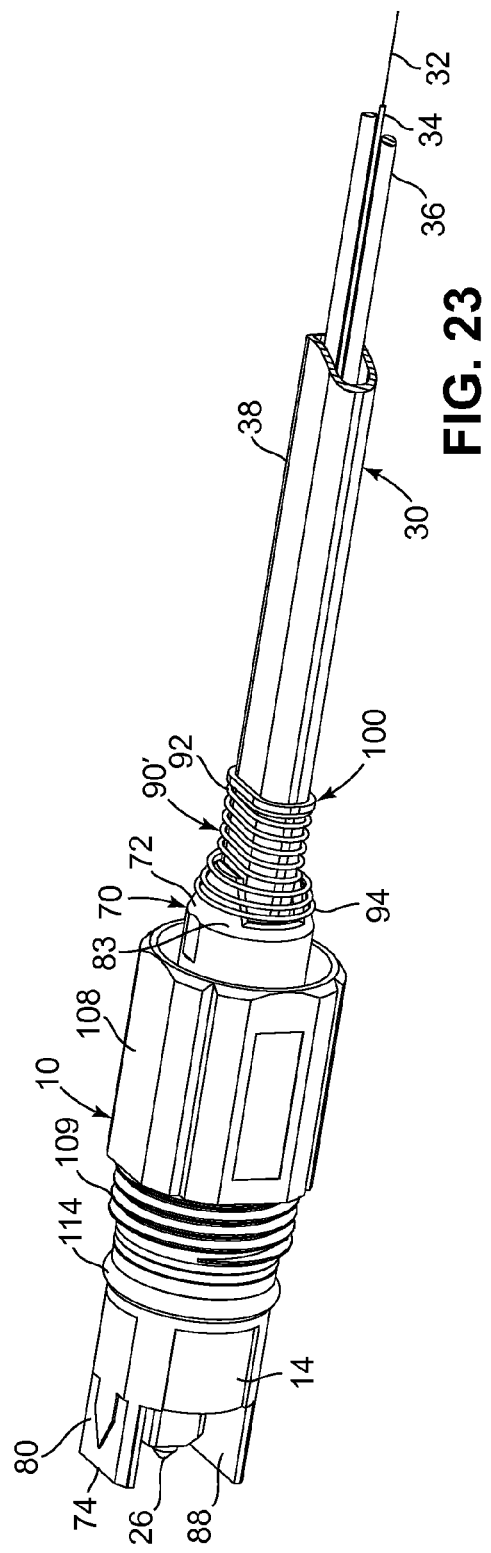
FIG. 23 is a perspective view, sharing the perspective of FIG. 1, of the fiber optic connector and cable of FIG. 1 with the boot and the shrink tube of FIG. 1 removed thereby revealing a spring engaging the shroud of FIG. 1.

The spring 90 and the shroud 70 can engage and interface with each other in a variety of ways. The figures of the present disclosure illustrate four different ways for the spring 90 and the shroud 70 to engage. The first way is illustrated at FIGS. 2, 3, 5, 6, 11, 12, and 14-16. The first way includes a shroud 70' with a pocket 84 at the proximal end 72 of the shroud 70' (see FIG. 12). The pocket 84 includes a shoulder 86 that abuts the distal end 94 of the spring 90. The pocket 84 can be configured to substantially enclose the spring 90. The second way is illustrated at FIGS. 7-10, 13, and 17-19. The second way includes a shroud 70" with a pair of reliefs 87 for the spring 90 on interior faces of the transition features 83 (see FIG. 13). The reliefs 87 allow a proximally facing surface 85 of the shroud 70" to abut the distal end 94 of the spring 90. The third way is illustrated at FIGS. 20-22. The third way includes a shroud 70 with a pair of proximally facing surfaces 81 at a proximal end of the transitioning features 83 (see FIGS. 20 and 22). The proximally facing surfaces 81 abut the distal end 94 of the spring 90. The fourth way is illustrated at FIGS. 23-25. The fourth way includes the spring 90' (see FIG. 26). The spring 90' includes a cable shaped region 91 that extends to the proximal end 92 of the spring 90' and an enlarged region 93 that extends to the distal end 94 of the spring 90'. The cable shaped region 91 is configured to fit over the jacket 38 of the cable 30. As depicted, the cable shaped region 91 fits closely over the cable 30. The enlarged region 93 is configured to seat against the pair of the transition features 83 at the proximal end 72 of the shroud 70. As depicted, the enlarged region 93 includes a conical shape that fits closely over the pair of the transition features 83. FIGS. 1 and 4 are ambiguous as to which of the four ways is used and could depict any of the four ways or another way for the spring 90 and the shroud 70 to engage.

By including the pocket 84 that substantially encloses the spring 90, the first way of the preceding paragraph avoids the heat shrink tube 110 immobilizing or partially immobilizing the spring 90 when in the shrunken configuration. Alternatively, a sleeve 104, positioned around the spring 90, can be included that shields or partially shields the spring 90 from compressive effects of the heat shrink tube 110 (see FIG. 8). The sleeve 104 can be added to the second, third, and fourth ways described in the preceding paragraph. The sleeve 104 can be a separate piece or the sleeve 104 can be integrated with the spring keeper 100. The spring 90, 90' can be selected with sufficient strength to provide the desired results, described above, with the heat shrink tube 110 in direct contact with the spring 90, 90'.

In various figures, a shape of the shrunken heat shrink tube 110 and an internal shape of the boot 120 vary. This variance illustrates that the heat shrink tube 110 and the boot 120 are flexible and, to a certain extent, take the shape of that which underlies them.

The present disclosure also relates to a method of connectorizing the fiber optic cable 30. The method includes: A) providing the fiber optic cable 30; B) providing the retention member 108; C) prepositioning the retention member 108 over the jacket 38 of the fiber optic cable 30; D) providing the boot 120; E) prepositioning the boot 120 over the jacket 38; F) providing the heat shrink tube 110; G) prepositioning the heat shrink tube 110 over the jacket 38; H) providing the spring keeper 100; I) prepositioning the spring keeper over the jacket 38; J) providing the spring 90; K) prepositioning the spring 90 over the jacket 38; L) providing the shroud 70; M) prepositioning the shroud 70 over the jacket 38; N) providing the ferrule mount 20 and prepositioning the plug body 28 of the ferrule mount 20 over the optical fiber 32; O) providing the ferrule 26; P) terminating the end 33 of the optical fiber 32 with the ferrule 26; Q) mounting the ferrule 26 within the plug body 28 of the ferrule mount 20 thereby attaching the ferrule mount 20 to the ferrule 26; R) mounting the plug body 28 and the strength members 36 of the fiber optic cable 30 between the pair of the half pieces 42, 44 of the ferrule mount 20 thereby attaching the ferrule mount 20 to the strength members 36; S) attaching the retaining sleeve 46 of the ferrule mount 20 over the portion 48 of the pair of the half pieces 42, 44 thereby retaining the half pieces 42, 44 to each other and to the plug body 28 and the strength members 36. T) engaging the interior retaining surface 78 of the shroud 70 with the exterior retaining surface 56 of the ferrule mount 20 by sliding the shroud 70 over the ferrule mount 20 in the distal direction 98; U) engaging the spring 90 with the shroud 70 such that the shroud 70 is urged by the spring 90 in the distal direction 98; V) engaging the spring keeper 100 and the spring 90 thereby compressing the spring against the shroud 70; W) engaging the spring keeper 100 with the fiber optic cable 30 and thereby engaging the compressed spring 90 with the fiber optic cable 30; X) shrinking the heat shrink tube 110 over a portion of the shroud 70 and over a portion of the jacket 38 (any urging of the shroud 70 by the heat shrink tube 110 in the proximal direction 96 relative to the fiber optic cable 30 is overcome by the spring 90 urging the shroud 70 in the distal direction 98 relative to the fiber optic cable 30); Y) positioning the boot 120 over the heat shrink tube 110; and Z) positioning the retention member 108 over a portion of the shroud 70 with the distally facing surface 106 of the retention member 108 adjacent the proximally facing shoulder 82 of the shroud 70. Connectorizing the fiber optic cable 30 can be accomplished by performing the above steps in the order presented. Alternatively, the above steps can be reordered and/or additional steps inserted and/or certain of the above steps discarded.

The fiber optic adapter 214, illustrated at FIGS. 27-29, includes a ruggedized housing 240 having a first piece 242 that defines an inner port 218 of the fiber optic adapter 214 and a second piece 244 that defines the outer port 216 of the fiber optic adapter 214. The first and second pieces 242, 244 can be interconnected by a snap-fit connection to form the ruggedized housing 240. An interior adapter housing 246 mounts inside the ruggedized housing 240. Springs 248 bias the interior adapter housing 246 toward the outer port 216 and allow the interior adapter housing 246 to float within the interior of the ruggedized housing 240. As shown at FIG. 29, the interior adapter housing 246 includes a cylindrical split sleeve holder 251 that houses a standard split sleeve 250. The split sleeve 250 is coaxially aligned with a center axis 252 of the fiber optic adapter 214. The split sleeve 250 includes an inner end 254 that faces toward the inner port 218 of the fiber optic adapter 214 and an outer end 256 that faces toward the outer port 216 of the fiber optic adapter 214. The fiber optic adapter 214 defines a plurality of internal threads 272 within the outer port 216 for use in securing a ruggedized fiber optic connector within the outer port 216. In the depicted embodiment, the internal threads 272 engage the external threads 109 of the retention member 108 to secure the fiber optic connector 10 within the outer port 216. The fiber optic adapter 214 also includes resilient latches 273 for retaining a non-ruggedized fiber optic connector (e.g., a standard SC connector) within the inner port 218. The latches 273 are located adjacent the inner port 218. The interior adapter housing 246 also defines a keying slot 247 adjacent the inner port 218 for ensuring that the non-ruggedized fiber optic connector is inserted into the inner port 218 at the proper rotational orientation. Resilient latches are not provided at the outer port 216. A dust plug 270 is mounted within the outer port 216 of the fiber optic adapter 214 to prevent the adapter 214 from being contaminated when no connector is inserted in the outer port 216 (see FIG. 27).

In certain explanations above, the fiber optic cable 30 and the connected ferrule mount 20 are chosen as a frame of reference. Alternatively, the shroud 70 could be chosen as a frame of reference. With the ferrule mount 20 as the frame of reference, the exterior and interior retaining surfaces 56, 78 limit movement of the shroud 70 in the distal direction 98 relative to the ferrule mount 20 and the attached fiber optic cable 30. With the shroud 70 as the frame of reference, the exterior and interior retaining surfaces 56, 78 limit movement of ferrule mount 20 in the proximal direction 96 relative to the shroud 70. With the ferrule mount 20 as the frame of reference, the spring 90 resists movement of the shroud 70 in the proximal direction 96 relative to the ferrule mount 20 and the attached fiber optic cable 30. With the shroud 70 as the frame of reference, the spring 90 resists movement of the fiber optic cable 30 in the distal direction 98 relative to the shroud 70.

In certain embodiments, the fiber optic connector 10 is a ruggedized fiber optic connector, and/or the fiber optic adapter 214 is a ruggedized fiber optic adapter. A sealing member 114 (e.g., an O-ring) can be mounted on a groove 89 on the exterior 77 of the shroud 70. The sealing member 114 is adapted to provide a seal between the distal end 74 of the shroud 70 and the fiber optic adapter 214.

In the present disclosure, fiber optic cables including buffer tubes are discussed and illustrated. Fiber optic cables including one or more optical fibers not within a buffer tube can be substituted for any of the illustrated fiber optic cables. Such optical fibers not within a buffer tube generally follow the same path as a buffered optical fiber.

From the forgoing detailed description, it will be evident that modifications and variations can be made in the devices of the disclosure without departing from the spirit or scope of the invention.

The invention claimed is:

1. A fiber optic connector extending between a proximal end and a distal end, the proximal end of the fiber optic connector adapted for attachment to a fiber optic cable and the distal end of the fiber optic connector adapted for connection with a fiber optic adapter, the fiber optic connector comprising:
   a ferrule adapted to hold at least one optical fiber of the fiber optic cable;
   a plug body adapted to mount the ferrule;
   a plug mount extending between a proximal end and a distal end, the proximal end of the plug mount adapted for attachment to at least one strength member of the fiber optic cable and the distal end of the plug mount adapted for mounting the plug body, the plug mount including a passage and an exterior retaining surface, the passage extending between the proximal end and the distal end of the plug mount and adapted to receive the at least one optical fiber of the fiber optic cable;
   a shroud extending between a proximal end and a distal end, the shroud including a through-passage extending between the proximal end and the distal end of the shroud, the through-passage of the shroud adapted to receive at least a portion of the plug mount, the shroud including an interior retaining surface adapted to engage the exterior retaining surface of the plug mount and thereby limit distal movement of the shroud relative to the plug mount;
   a spring including a first end and a second end, the first end of the spring adapted to engage a jacket of the fiber optic cable and the second end of the spring adapted to engage the shroud, the spring adapted to urge the shroud in a distal direction relative to the fiber optic cable.

2. The fiber optic connector of claim 1, wherein the spring is a compression spring, the first end of the compression spring is a proximal end, and the second end of the compression spring is a distal end.

3. The fiber optic connector of claim 2, further comprising a spring keeper adapted to engage the proximal end of the compression spring and adapted for attachment to the jacket of the fiber optic cable thereby engaging the proximal end of the compression spring with the fiber optic cable.

4. The fiber optic connector of claim 2, wherein the proximal end of the shroud is adapted to abut the distal end of the compression spring.

5. The fiber optic connector of claim 4, wherein the distal end of the compression spring is enlarged.

6. The fiber optic connector of claim 4, further comprising a sleeve positioned around the compression spring.

7. The fiber optic connector of claim 2, wherein the shroud includes a pocket with a shoulder adapted to abut the distal end of the compression spring.

8. The fiber optic connector of claim 7, wherein the pocket is adapted to substantially enclose the compression spring.

9. The fiber optic connector of claim 8, further comprising a shrink tube adapted to provide a seal between the proximal end of the shroud and the jacket of the fiber optic cable.

10. The fiber optic connector of claim 9, wherein any urging of the shroud by the shrink tube in a proximal direction relative to the fiber optic cable is overcome by the compression spring urging the shroud in the distal direction relative to the fiber optic cable.

11. The fiber optic connector of claim 1, wherein the shroud includes a pair of opposed paddles at the distal end of the shroud adapted to engage the fiber optic adapter.

12. The fiber optic connector of claim 1, wherein the plug mount includes a pair of half pieces and a retaining sleeve adapted to retain the half pieces to each other.

13. The fiber optic connector of claim 12, wherein the at least one strength member of the fiber optic cable includes a pair of the strength members positioned on opposite sides of the at least one optical fiber, and wherein the half pieces each include a pair of grooves adapted to receive the pair of the strength members of the fiber optic cable.

14. The fiber optic connector of claim 1, wherein the exterior retaining surface of the plug mount is a proximally facing shoulder and the interior retaining surface of the shroud is a distally facing shoulder.

15. A fiber optic connector extending between a proximal end and a distal end, the proximal end of the fiber optic connector adapted for attachment to a fiber optic cable and the distal end of the fiber optic connector adapted for connection with a fiber optic adapter, the fiber optic connector comprising:
   a ferrule adapted to hold at least one optical fiber of the fiber optic cable;
   a plug body adapted to mount the ferrule;
   a plug mount extending between a proximal end and a distal end, the proximal end of the plug mount adapted for attachment to at least one strength member of the fiber optic cable and the distal end of the plug mount adapted for mounting the plug body, the plug mount including a passage and an exterior retaining surface, the passage extending between the proximal end and the distal end of the plug mount and adapted to receive the at least one optical fiber of the fiber optic cable;
   a shroud extending between a proximal end and a distal end, the shroud including a through-passage extending between the proximal end and the distal end of the shroud, the through-passage of the shroud adapted to receive at least a portion of the plug mount, the shroud including an interior retaining surface adapted to engage the exterior retaining surface of the plug mount and thereby limit distal movement of the shroud relative to the plug mount;
   a spring including a first end and a second end, the first end of the spring adapted to engage the fiber optic cable and the second end of the spring adapted to engage the shroud, the spring adapted to urge the shroud in a distal direction relative to the fiber optic cable; and
   a retention member adapted for connection with the fiber optic adapter, the retention member including a first abutment surface, wherein the shroud includes a second abutment surface adapted to abut the first abutment surface of the retention member.

16. The fiber optic connector of claim 15, wherein the retention member is a threaded retaining nut, the first abutment surface of the threaded retaining nut includes a distally facing surface, and the second abutment surface of the shroud includes a proximally facing shoulder on an exterior of the shroud.

17. The fiber optic connector of claim 16, further comprising a shrink tube adapted to provide a first seal between the proximal end of the shroud and a jacket of the fiber optic cable and a sealing member mounted on the shroud, the sealing member adapted to provide a second seal between the distal end of the shroud and the fiber optic adapter.

18. A method of connectorizing a fiber optic cable, the method comprising:
   providing the fiber optic cable, the fiber optic cable including at least one optical fiber, at least one strength member, and a jacket surrounding the at least one optical fiber and the at least one strength member;

providing and positioning a shrink tube over the jacket of the fiber optic cable;

providing and positioning a spring over the jacket of the fiber optic cable;

providing and positioning a shroud over the jacket of the fiber optic cable, the shroud including an interior retaining surface;

providing a ferrule;

terminating an end of the at least one optical fiber with the ferrule;

providing and attaching a ferrule mount to the ferrule and also attaching the ferrule mount to the at least one strength member of the fiber optic cable, the ferrule mount including an exterior retaining surface;

engaging the interior retaining surface of the shroud with the exterior retaining surface of the ferrule mount by sliding the shroud over the ferrule mount in a distal direction; and engaging the spring with the fiber optic cable and engaging the spring with the shroud such that the shroud is urged by the spring in the distal direction.

19. The method of claim 18, further comprising shrinking the shrink tube over at least a portion of the shroud and over at least a portion of the jacket of the fiber optic cable.

20. The method of claim 19, wherein any urging of the shroud by the shrink tube in a proximal direction relative to the fiber optic cable is overcome by the spring urging the shroud in the distal direction relative to the fiber optic cable.

21. The method of claim 18, further comprising providing a spring keeper and engaging the spring keeper with the jacket of the fiber optic cable and the spring thereby engaging the spring with the fiber optic cable.

22. The method of claim 18, further comprising providing a retention member including a distally facing surface, the retention member adapted for connection with a fiber optic adapter, positioning the retention member over at least a portion of the shroud, and positioning the distally facing surface of the retention member adjacent a proximally facing shoulder of the shroud.

23. The method of claim 18, further comprising mounting the ferrule within a plug body of the ferrule mount thereby attaching the ferrule mount to the ferrule, mounting the plug body and the at least one strength member of the fiber optic cable between a pair of half pieces of the ferrule mount thereby attaching the ferrule mount to the at least one strength member, and attaching a retaining sleeve of the ferrule mount over at least a portion of the pair of the half pieces thereby retaining the half pieces to each other and to the plug body and the at least one strength member.

24. A fiber optic connector and cable assembly adapted for connection with a fiber optic adapter, the fiber optic connector and cable assembly comprising:

a fiber optic cable including at least one optical fiber and at least one strength member;

a ferrule terminating an end of the at least one optical fiber;

a ferrule mount extending between a proximal end and a distal end, the proximal end of the ferrule mount attached to the at least one strength member of the fiber optic cable and the distal end of the ferrule mount mounting the ferrule, the ferrule mount including a passage and an exterior retaining surface, the passage extending between the proximal end and the distal end of the ferrule mount and receiving the at least one optical fiber of the fiber optic cable;

a shroud extending between a proximal end and a distal end, the shroud including a through-passage extending between the proximal end and the distal end of the shroud, the through-passage of the shroud receiving at least a portion of the ferrule mount, the through-passage of the shroud including an interior retaining surface engaging the exterior retaining surface of the ferrule mount and thereby limiting distal movement of the shroud relative to the ferrule mount;

a spring including a first end and a second end, the first end of the spring engaging jacket of the fiber optic cable and the second end of the spring engaging the shroud, the spring urging the shroud in a distal direction relative to the fiber optic cable.

* * * * *